United States Patent [19]

Burmeister et al.

[11] Patent Number: 4,867,717
[45] Date of Patent: Sep. 19, 1989

[54] CONNECTING ASSEMBLY INCLUDING SCREW RETENTION MEANS

[75] Inventors: Scott N. Burmeister, Gurnee; Steven R. McNeill, Waukegan, both of Ill.

[73] Assignee: Outboard Marine Corporation, Waukegan, Ill.

[21] Appl. No.: 184,500

[22] Filed: Oct. 24, 1988

[51] Int. Cl.[4] .............................................. F16B 1/04
[52] U.S. Cl. ........................................ 440/86; 74/477; 74/480 B; 74/DIG. 8
[58] Field of Search ............... 440/86, 84; 403/344, 403/321, 324, 384, 386, 52, 66, 68, 70, 71; 74/469, 477, 471 R, 473 R, 479, 480 R, 480 B, DIG. 8

[56] References Cited

U.S. PATENT DOCUMENTS

| 2,887,083 | 5/1959 | Conroy | 440/86 |
| 3,145,688 | 8/1964 | Kincannon | 440/86 |
| 3,867,050 | 2/1975 | Pitner | 403/373 |
| 4,597,686 | 7/1986 | Peterson | 440/86 |

*Primary Examiner*—Joseph F. Peters, Jr.
*Assistant Examiner*—Clifford T. Bartz
*Attorney, Agent, or Firm*—Michael, Best & Friedrich

[57] ABSTRACT

Disclosed herein is a marine propulsion device comprising a propulsion unit including a gear case rotatably supporting a propeller shaft adapted to carry a propeller, a transmission in the gear case operably connected to the propeller shaft, a support having a bore, a link including a first side portion having a first and second spaced apertures, a second side portion extending in spaced parallel relation to the first link side portion and including first and second spaced apertures in alignment with the first and second spaced aperture in the first link side portion, which second aperture in the second link side portion has a smaller diameter than the second aperture in the first link side portion, a bolt comprising a head portion having a transverse dimension and engaging the first link side portion, a threaded portion extending in the second aperture in the second link side portion and threadedly engaged with the second link side portion, and a barrel portion connecting the head portion and the threaded portion and having a diameter greater than the threaded portion and less than the transverse dimension of the head portion and including a first end adjacent the head portion and extending through the second aperture in the first link side portion, a second end adjacent the threaded portion and engaging the second link side portion, and a central portion intermediate the first and second ends, a first member adapted to be manually manipulated, rotatably extending in the bore, and being non-rotatably received in the first apertures in first and second link side portions, and a second member operably connected to the transmission and including and end portion having an aperture rotatably receiving the central portion of the barrel portion.

14 Claims, 1 Drawing Sheet

U.S. Patent   Sep. 19, 1989   4,867,717
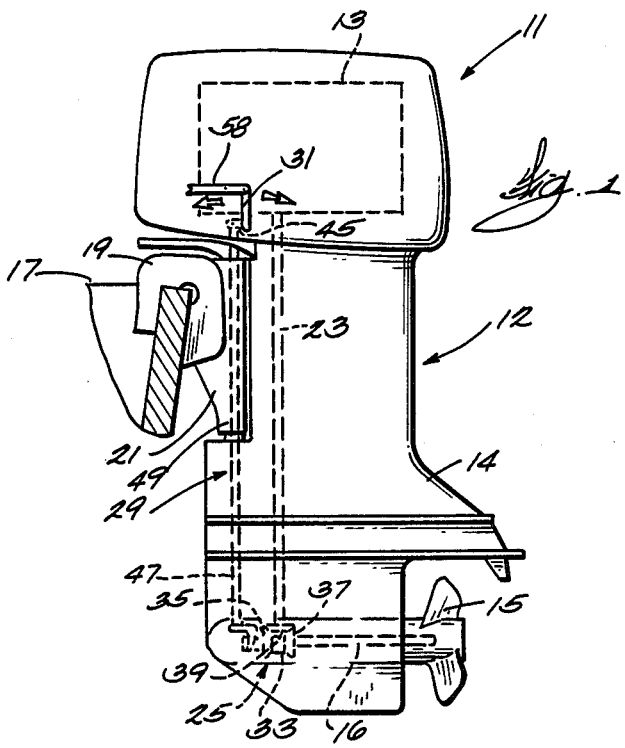
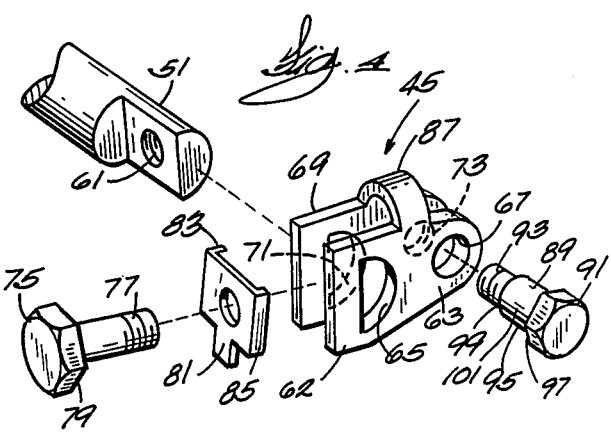
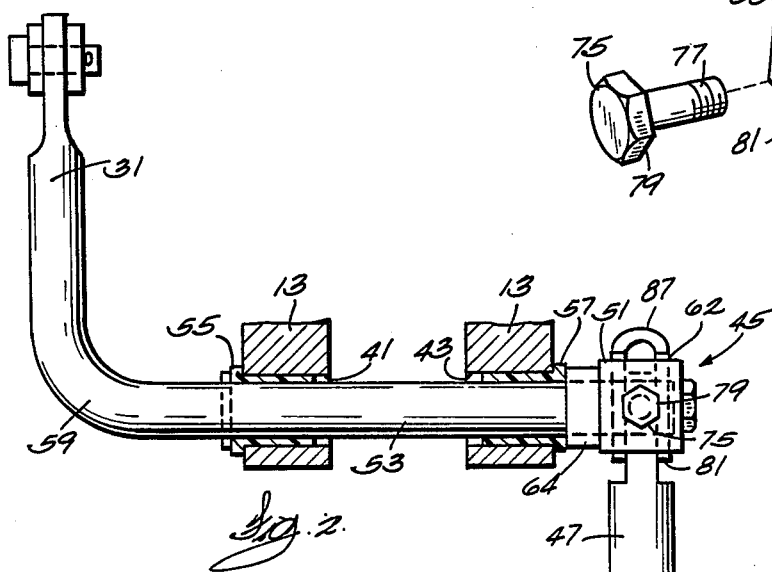
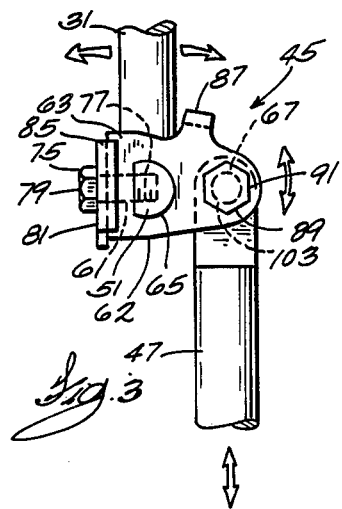

CONNECTING ASSEMBLY INCLUDING SCREW RETENTION MEANS

BACKGROUND OF THE INVENTION

This invention relates to connecting assemblies, especially connecting assemblies which are used to transmit rotational motion of a first member to translational motion of a second member and vice versa. This invention is especially adaptable for connecting a manually rotatable shift lever found on the side of an outboard motor with a vertical shift rod.

Previous attempts to make a linkage for this purpose have resulted in linkages which are either expensive to construct or which will loosen when exposed to excessive vibration. Attention is directed to the following U.S. patents:

| U.S. Pat. No. | Inventor's Name | Issue Date |
| --- | --- | --- |
| 2,728,320 | Kloss | December 27, 1955 |
| 3,145,688 | Kincannon | August 25, 1964 |
| 4,597,686 | Peterson | July 1, 1986 |

SUMMARY OF THE INVENTION

The invention provides a marine propulsion device comprising a propulsion unit including a gearcase rotatably supporting a propeller shaft adapted to carry a propeller, a transmission in the gearcase operably connected to the propeller shaft, a support having a bore, a link including a first side portion having first and second spaced apertures, a second side portion extending in spaced parallel relation to the first link side portion and including first and second spaced apertures in alignment with the first and second spaced apertures in the first link side portion, the second aperture in the second link side portion having a smaller diameter than the second aperture in the first link side portion, a bolt comprising a head portion having a transverse dimension and engaging the first link side portion, a threaded portion extending in the second aperture in the second link side portion and threadedly engaged with the second link side portion, and a barrel portion connecting the head portion and the threaded portion and having a diameter greater than the threaded portion and less than the transverse dimension of the head portion and including a first end adjacent the head portion and extending through the second aperture in the first link side portion, and a second end adjacent the threaded portion and engaging the second link side portion, a first member adapted to be manually manipulated, rotatably extending in the bore, and being nonrotatably received in the first apertures in the first and second link side portions, and a second member operably connected to the clutch and including an end portion having an aperture rotatably receiving the barrel portion.

In one embodiment, the marine propulsion device has a connecting assembly wherein the first link side portion and the second link side portion are connected by a bridge and the bridge establishes a predetermined distance between the link side portions.

In one embodiment, the marine propulsion device has a connecting assembly wherein the threaded portion of the bolt threadedly engages the second link side portion.

In one embodiment, the marine propulsion device has a connecting assembly wherein the aperture in the second member has a depth and the predetermined distance between the side portions is greater than the depth of the aperture in the second member.

In one embodiment, the marine propulsion device has a connecting assembly further including a screw and the first member further includes a threaded bore and the link is held in place on the first member by the screw being threadedly engaged in the first member threaded bore.

In one embodiment, the marine propulsion device has a connecting assembly wherein the screw is positioned between the first link side portion and the second link side portion.

This invention also provides a connecting assembly for a transmission for a marine propulsion device comprising a support having a bore, a link including a first side portion having first and second spaced apertures, a second side portion extending in space parallel relation to the first link side portion and including first and second spaced apertures in alignment with the first and second spaced apertures in the first link side portion, the second aperture in the second link side portion having a smaller diameter than the second aperture in the first link side portion, a bolt comprising a head portion having a transverse dimension and engaging the first link side portion, a threaded portion extending in the second aperture in the second link side portion and threadedly engaged with said second link side portion, and a barrel connecting the head portion and the threaded portion and having a diameter greater than the threaded portion and less than the transverse dimension of the head portion and including a first end adjacent the head portion and extending through the second aperture in the first link side portion, and a second end adjacent the threaded portion and engaging the second link side portion, and a first member rotatably extending in the bore and being nonrotatably received in the first apertures in the first and second link side portions, and a second member including an end portion having an aperture rotatably receiving the barrel portion.

One of the principal features of the invention is the provision of a connecting assembly permitting connection and disconnection of a first rotating member with a second member having linear motion at a right angle to the first member.

Another of the principal features of the invention is the provision of such an easily assembleable linkage which permits nonbinding relative motion between the members, but which will not become disassembled even when subjected to excessive vibration.

Another of the principal features of the invention is the provision of such a connecting assembly which is simple and easy to manufacture.

Various other of the features of the invention will become apparent upon reviewing the following drawings, descriptions, and appended claims.

BRIEF DESCRIPTION OF THE DRAWINGS

FIG. 1 is a side view of a marine propulsion device generally showing the invention.

FIG. 2 is a back view, partially broken away which includes a second member attached to a first member and which embodies various features of the invention.

FIG. 3 is an end view of the connecting assembly shown in FIG. 2.

FIG. 4 is an exploded view of various portions of the connecting assembly.

Before explaining the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology employed herein is for the purpose of description and should not be regarded as limiting.

DESCRIPTION OF THE PREFERRED EMBODIMENT

Shown in FIG. 1 is a marine propulsion device 11 comprising a lower unit 12 including a gear case 14 supporting a propeller shaft 16 for rotary movement. Fixed on the propeller shaft 16 for common rotation therewith is a propulsion element in the form of a propeller 15.

In one embodiment, the marine propulsion device 11 is pivotally attached to the watercraft 17 by means of a stern bracket 19 for rotation about a generally horizontal axis and includes a swivel bracket 21 for pivotal movement about a generally vertical axis. However, this invention has application to other forms of marine propulsion devices such as stern drives or OMC Sea Drive marine propulsion systems.

Atop the gear case 14 is a prime mover 13 such as an internal combustion engine drivingly connected to the propeller shaft 16 and propeller 15 by a vertical drive shaft 23 and forward, neutral reverse transmission 25. In a preferred embodiment, this transmission is in the lower portion of the gear case and includes a pair of counter rotating bevel gears 35 and 37 mounted on the propeller shaft, each being driven by a pinion gear 39 attached to the lower end of the drive shaft 23 as is generally known in the art. The transmission 25 can be selected to transfer rotation of the drive shaft 23 into either clockwise, counterclockwise or no rotation of the propeller shaft 16 and associated propeller 15 by means of the shifter assembly generally designated by numeral 29.

The shifter assembly 29 generally comprises a manually operable lever 31 near the engine 13 operably connected to a power transfer means 33, such as a dog clutch, which comprises part of the transmission 25 and is located on the propeller shaft 16 to engage one of two bevel gears 35 and 37 into driving engagement with the propeller shaft 16. More specifically the manually operated lever 31 rotates about a generally horizontal axis formed by a pair of aligned bores 41 and 43 in a support formed in the lower portion of the block or crank case of the internal combustion engine 13. This rotation causes rotation of the novel connecting or linkage assembly 45 which will be explained in more detail. The rotation of the connecting assembly 45, in turn, causes vertical almost linear motion of the vertical shift rod 47, which is operably connected to the clutch dog 33 to move it into and out of engagement with the selected bevel gear 35 or 37.

As can be seen in FIG. 1, in the preferred embodiment, the vertical shift rod extends through the pivot tube 49 which acts as the vertical axis for steering the outboard motor, and terminates at its upper end immediately below the engine 13. This location has little clearance from above or below, but is accessible from the side to allow connection of the vertical shift rod 47 to the connecting assembly 45 which is mounted for rotation with the manually operable shift lever. It can be appreciated that, at this location near the engine 13, the linkage 45 is subjected to vibration which would tend to loosen any fastening devices of which it may comprise.

The connecting assembly 45 links a first end 51 of a first or rotating member 53 which rotates in bushings 55 and 57 in bores 41 and 43 to the vertical shift rod 47. The rotating member 53 will rotate when the operator of the marine propulsion device 11 moves the manually operated lever 31 which is connected at a right angle to the second end 59 of the first member. In some installations, the operator may manually manipulate lever 31, while in other instances, the lever may be connected by cables and associated linkages 58 to a remote control box (not shown). In the preferred embodiment, the first end 51 of the first or rotating member 53 has a "D" shaped cross section extending in for a distance from the end. In the flat section of the "D" is a transverse threaded bore 61. Between the linkage assembly 45 and the bushing 57 is a spacer 64 for positioning the first member 53.

The connecting or linkage assembly 45 comprises a link 62 having first side portion 63 having first 65 and second 67 spaced apertures and a second link side portion 69 extending in spaced parallel relation to the first link side portion 63 and including first 71 and second 73 spaced apertures in alignment with the first 65 and second 67 spaced apertures of the first link side portion 63. The first apertures 65 and 71 of each of the side portions 63 and 69 are approximately the same size and are slightly larger than the first end 51 of the rotating member 53. The first apertures 65 and 71 are also "D" shaped to complement the "D" shape of the first end 51 of the rotating member so that link 62 can be slid over the first end and will rotate with the rotating member 53.

Although alternate positioning means may be used, preferably, the link 62 will be held in place axially on the rotating member 53 by a screw 75 having a threaded portion 77 and a head portion 79 along with a washer 81. The screw extends in the threaded bore 61 and the threaded portion extends between the side portions 63 and 69 of the link and engages the rotating or first member 53. The head 79 of the screw contacts the washer 81 which has lateral sides 83 and 85 which overlap and position the link 45.

The first and second link side portions 63 and 69 are laterally spaced by a bridge 87 connected on the top of each of the link side portions at a point between the first and second apertures 65, 67, 71 and 73. The bridge establishes a predetermined distance between the link side portions 63 and 69. The second aperture 73 in the second side portion 69 is of a smaller diameter than the second aperture 67 of the first link side portion 63 and, preferably is threaded. A bolt 89 comprising a head portion 91 having a transverse dimension larger than the diameter of the second aperture 67 of the first side portion engages the first side portion. The bolt also has a threaded portion 93 which extends in the second aperture 73 of the second link side portion 69 and engages the second link side portion 69. In addition, the bolt includes a barrel portion 95 connecting the head portion 91 and the threaded portion 93 and having a diameter greater than the threaded portion 93 and less than the transverse dimension of the head portion 91 and including a first end adjacent the head portion and extending through the second aperture 67 in the first link side portion 63. The barrel portion 95 also has a second end 99 adjacent the threaded portion 93 which engages the second link side portion 69 and a central portion 101 intermediate the first and second ends.

When in use, the central portion 101 of the bolt 89 extends through a transverse aperture 103 near the top end of the vertical shift rod 47. The depth of the aperture 101, or the thickness of the top end of the shift rod, is less than the distance between the link side portions 63 and 69 and less than the length of the barrel portion 95 of the bolt 89. Thus, when the bolt 89 is screwed into the second aperture 73 of the second link side portion 69 the head portion 91 of the bolt initially contacts first link side portion before the barrel second end 99 contacts the link second side portion 69. As the bolt is screwed further, the bridge 87 deflects allowing the first link side portion to move toward the second link side portion and placing a torque on the threads of the bolt 89. After screwing further, the barrel first end portion 99 contacts the link second side which establishes the spacing between the first 63 and second 69 link side portions.

It can be appreciated that by the above construction, the linkage assembly 45 will provide for nonbinding linear motion of the vertical shift rod 47 as the rotating member 53 is turned by the manual shift lever 31. Moreover, the bolt 89 connecting the vertical shift rod 47 to the link 62 is torqued by the springing action of the bridge so that it will not loosen when subjected to vibration. Moreover, the link 62 can be cheaply and easily made by stamping it from a sheet of steel, drilling the threads into the second aperture 73 of the second link side portion 69 and folding the link along the bridge to allow the side portion to be in parallel spaced relation.

We claim:

1. A marine propulsion device comprising a propulsion unit including a gear case rotatably supporting a propeller shaft adapted to carry a propeller, a transmission in said gear case operably connected to said propeller shaft, a support having a bore, a link including a first side portion having first and second spaced apertures, a second side portion extending in spaced parallel relation to said first link side portion and including first and second spaced apertures in alignment with said first and second spaced apertures in said first link side portion, said second aperture in said second link side portion having a smaller diameter than said second aperture in said first link side portion, a bolt comprising a head portion having a transverse dimension and engaging said first link side portion, a threaded portion extending in said second aperture in said second link side portion and threadedly engaged with said second link side portion, and a barrel portion connecting said head portion and said threaded portion and having a diameter greater than said threaded portion and less than said transverse dimension of said head portion and including a first end adjacent said head portion and extending through said second aperture in said first link side portion, and a second end adjacent said threaded portion and engaging said second link side portion, a first member adapted to be manually manipulated, rotatably extending in said bore, and being non-rotatably received in said first apertures in said first and second link side portions, and a second member operably connected to said transmission and including an end portion having an aperture rotatably receiving said barrel portion.

2. A propulsion device in accordance with claim 1 wherein the first link side portion and the second link side portion are connected by a bridge and said bridge establishes an initial predetermined distance between said link side portions.

3. A propulsion device in accordance with claim 2 wherein the aperture in said second member has a depth and said predetermined distance between said side portions is greater than said depth of said aperture in said second member.

4. A propulsion device in accordance with claim 3 wherein the bolt barrel portion has a length and said length is greater than said depth of said aperture of said second member.

5. A propulsion device in accordance with claim 4 wherein said first link side portion exerts a force on said bolt head portion.

6. A propulsion device in accordance with claim 5 further including a screw and wherein said first member further includes a threaded bore and said link is held in place on said first member by the screw being threadedly engaged with said first member.

7. A propulsion device in accordance with claim 6 wherein the screw is positioned between the first link side portion and said second link side portion.

8. A connecting assembly for a transmission apparatus for a marine propulsion device comprising a support having a bore, a link including a first side portion having first and second spaced apertures, a second side portion extending in spaced parallel relation to said first link side portion and including first and second spaced apertures in alignment with said first and second spaced apertures in said first link side portion, said second aperture in said second link side portion having a smaller diameter than said second aperture in said first link side portion, a bolt comprising a head portion having a transverse dimension and engaging said first link side portion, a threaded portion extending in said second aperture in said second link side portion and threadedly engaged with said second link side portion, and a barrel portion connecting said head portion and said threaded portion and having a diameter greater than said threaded portion and less than said transverse dimension of said head portion and including a first end adjacent said head portion and extending through said second aperture in said first link side portion, and a second end adjacent said threaded portion and engaging said second link side portion, a first member rotatably extending in said bore and being non-rotatably received in said first apertures in said first and second link side portions, and a second member including an end portion having an aperture rotatably receiving said barrel portion.

9. A connecting assembly in accordance with claim 8 wherein the first link side portion and the second link side portion are connected by a bridge and said bridge establishes an initial predetermined distance between said link side portions.

10. A connecting assembly in accordance with claim 9 wherein the aperture in said second member has a depth and said predetermined distance between said side portions is greater than said depth of said aperture in said second member.

11. A connecting assembly in accordance with claim 10 wherein the bolt barrel portion has a length and said length is greater than said depth of said aperture of said second member.

12. A connecting assembly in accordance with claim 11 wherein said first link side portion exerts a force on said bolt head portion.

13. A connecting assembly in accordance with claim 12 further including a screw and wherein said first member further includes a threaded bore and said link is held in place on said first member by the screw being threadedly engaged with said first member.

14. A connecting assembly in accordance with claim 13 wherein the screw is positioned between the first link side portion and said second link side portion.

* * * * *